United States Patent [19]

Go et al.

[11] 3,886,110

[45] May 27, 1975

[54] AQUEOUS COATING COMPOSITION

[75] Inventors: Tadahiro Go; Takashi Suzuki, both of Kawasaki, Japan

[73] Assignee: Nippon Zeon Co., Ltd., Tokyo, Japan

[22] Filed: Feb. 11, 1974

[21] Appl. No.: 441,460

[30] Foreign Application Priority Data

Feb. 17, 1973 Japan.............................. 48-19443

[52] U.S. Cl. 260/29.7 H; 260/29.7 T; 260/29.7 AT; 260/29.7 N; 260/78.5 BB; 260/80.73; 260/80.8; 260/82.1
[51] Int. Cl...... C08d 5/02; C08f 27/04; C08f 27/08
[58] Field of Search 260/29.7 AT, 29.7 UP, 29.7 H, 260/29.7 T, 83.7, 82.1, 78.5 BB, 29.7 N, 80.73, 80.8

[56] References Cited
UNITED STATES PATENTS

| 3,518,238 | 6/1970 | Onishi et al.................... | 260/80.7 |
|---|---|---|---|
| 3,753,967 | 8/1973 | Graff et al. ...................... | 260/82.1 |

FOREIGN PATENTS OR APPLICATIONS

| 2,230,831 | 1/1973 | Germany |
| 962,974 | 7/1964 | United Kingdom |
| 1,016,957 | 1/1966 | United Kingdom |
| 1,019,658 | 2/1966 | United Kingdom |
| 1,019,659 | 2/1966 | United Kingdom |
| 1,033,833 | 6/1966 | United Kingdom |
| 1,104,418 | 2/1968 | United Kingdom |
| 1,112,062 | 5/1968 | United Kingdom |
| 1,148,914 | 4/1969 | United Kingdom |

OTHER PUBLICATIONS

Yeates, Electropainting, 2nd ed., pp. 78–85, 101 (Draper, 1970).

*Primary Examiner*—Morris Liebman
*Assistant Examiner*—T. DeBenedictis, Sr.
*Attorney, Agent, or Firm*—Frank J. Jordan

[57] ABSTRACT

Aqueous coating compositions comprising a water-soluble or water-dispersible copolymer prepared by polymerizing 1,3-pentadiene, 1,3-butadiene and, if desired, at least one other olefin copolymerizable therewith to form a liquid copolymer which is then addition reacted with an $\alpha,\beta$-unsaturated dicarboxylic compound and neutralized to make it soluble or dispersible in water; and processes for preparing same.

13 Claims, No Drawings

AQUEOUS COATING COMPOSITION

This invention relates to an aqueous coating composition and more particularly to an aqueous coating composition particularly suitable for the electrophoretic formation of a thin film or coating, the aqueous coating composition comprising as the main component a water-soluble or water-dispersible copolymer prepared by cationically polymerizing 1,3-pentadiene and 1,3-butadiene, addition reacting the resulting copolymer with an $\alpha,\beta$-unsaturated dicarboxylic compound and then neutralizing the thus-reacted copolymer.

As a coating technique, the electrophoretic or cataphoretic coating technique has recently drawn the attention of those in the art and it is now in the process of being rapidly assimilated into practical or industrial use. It has heretofore been known to modify with maleic anhydride, a natural drying oil such as linseed oil, dehydrated castor oil or tung oil, to thereby make the oil soluble in water. On the other hand, it has recently been found that natural drying oils may be substituted by liquid polymers such as liquid 1,2-polybutadienes and cis-1,4-polybutadienes, and, that among others, liquid cis-1,4-polybutadienes may be used in the preparation of excellent electrophoretic coating materials that are now widely in practical use. However, such polybutadienes are disadvantageous since they cause gelling as a side reaction when addition reacted with an $\alpha,\beta$-unsaturated dicarboxylic compound for their solubilization in water; and the adduct so obtained will give an aqueous coating composition having somewhat unsatisfactory throwing power if it constitues the main component in said composition.

However, it is known from Deutsche Offenlegungsschrift 2,230,831 that such disadvantages of a liquid cis-1,4-polybutadiene can be overcome by using suitable proportions of a mixture of liquid polypentadiene prepared by cationic polymerization. The inventors were interested in this fact and made various studies on electrophoretic coating materials prepared from a liquid polypentadiene and, as a result, found that if the liquid polypentadiene is solely used in the formation of coatings or films thereof then the coatings will be very superior in resistance to washability, drainage, throwing power and the like, whereas they will be inferior in film properties such as Erichsen value, Du Pont impact strength and solvent resistance. In the course of their making further studies in an attempt to overcome these inferiorities they have found that the use, as the main component, of a new copolymer prepared by cationically polymerizing 1,3-pentadiene and 1,3-butadiene to form a liquid copolymer, addition reacting the liquid copolymer with an $\alpha,\beta$-unsaturated dicarboxylic compound and then neutralizing the thus-reacted copolymer with an alkaline material to make it water-soluble or water-dispersible, will give coating compositions capable of forming coatings having remarkably improved electrical insulation and hardness thereby accomplishing the goals of this invention.

A primary object of this invention is to provide an aqueous coating composition which is suitable as an electrophoretically thin film-forming coating material.

Another object of this invention is to provide an aqueous coating composition having excellent electrophoretic characteristics.

A further object is to provide a coating composition which is capable of forming therefrom coatings having improved capabilities.

These and other objects can be attained by the provision of a coating composition obtained by addition reacting, with an $\alpha,\beta$-unsaturated dicarboxylic compound, a starting liquid copolymer having an average molecular weight of 500 – 5,000 and having been prepared by the polymerization of a monomeric mixture of 1,3-pentadiene and 1,3-butadiene in the presence of a Friedel-Crafts type catalyst.

Hereinafter, the terms "1,3-pentadiene" and "1,3-butadiene" are sometimes referred to respectively as "PD" and "BD" for simplicity.

A PD-BD copolymer which can be used as the starting copolymer in this invention, comprises 90 – 50% by weight of units derived from 1,3-pentadiene and 10 – 50% by weight of units derived from 1,3-butadiene and has an average molecular weight of 500 – 5,000 and an iodine value of at least 250 as determined by the Wijs method. The PD-BD copolymer is generally prepared by copolymerizing a monomeric mixture containing 90 – 50% by weight of 1,3-pentadiene and 10 – 50% by weight of 1,3-butadiene in the presence of a Friedel-Crafts type catalyst. The copolymerization is carried out at temperatures of from $-80°$ to $150°C$, preferably from $0°$ to $100°C$. Such PD-BD copolymer may further comprise small amounts (up to 20% by weight of the copolymer) of other polymerizable olefin units such as butene-1, isobutylene, isoprene, 2-methylbutene-2 and cyclopentene units. If the content of 1,3-pentadiene units in such a PD-BD or starting copolymer is more than 90% by weight, the coating composition derived from this copolymer will not be able to form films satisfactorily improved in Erichsen value and Du Pont impact strength, while if the content thereof in such a starting liquid copolymer is less than 50% by weight, the starting copolymer will not be a homogeneous liquid one since it causes gelling due to the increased 1,3-butadiene units. The combined use of 1,3-pentadiene and 1,3-butadiene in preparing a starting copolymer therefrom is one of the important features of this invention for, the use of isoprene as a substitute for the 1,3-butadiene will not attain the object of this invention although both isoprene and 1,3 butadiene are conjugated dienes.

In the practice of this invention, 100 parts by weight of a liquid PD-BD copolymer are reacted with 3 – 100 and preferably 3 – 40 parts by weight of an $\alpha,\beta$-unsaturated dicarboxylic compound. This copolymer and this type of dicarboxylic compound can be very easily reacted with each other without gel formation. On the other hand, after a liquid polypentadiene has allowed an $\alpha,\beta$-unsaturated dicarboxylic compound to be added thereto in the amount of 40 parts by weight per 100 parts by weight of polypentadiene, a further addition reaction tends to proceed at a lowered rate. The excellent reactivity of the PD-BD copolymer with an $\alpha,\beta$-unsaturated dicarboxylic compound is one of the characteristics of this invention and the reaction therebetween can be completed in a short time, while the use of a cis-polybutadiene is liable to cause gel formation and the use of a liquid 1,2-polybutadiene allows the addition reaction to proceed very slowly.

The $\alpha,\beta$-unsaturated dicarboxylic compounds which may be used herein are represented by the following general formula:

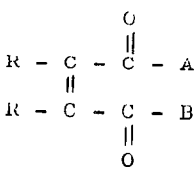

wherein R and R' are each a hydrogen atom, halogen atom or alkyl group and wherein A and B are each a hydroxyl group, alkoxy group, or —O— bond formed by A and B together, with the exception that A and B are not simultaneously an alkoxy group. Examples of these dicarboxylic compounds are preferably those having not more than 8 carbon atoms, such as maleic acid, maleic anhydride, chloromaleic anhydride, citraconic anhydride, 1,2-diethylmaleic anhydride, monomethyl maleate and monoethyl maleate. Among others, maleic anhydride is recommended from the view-point of economy and quality. The reaction of the PD-BD copolymer with the $\alpha,\beta$-unsaturated dicarboxylic compound is carried out at 50° – 300°C, preferably 150°–250°C for 5 minutes (1/12 hour) - 10 hours, preferably 1 – 5 hours. If required in this reaction there may be used an anti-gelling agent such as tertiary-amyl hydroquinone, hydroquinone, diphenylamine, 2,6-ditertiarybutyl-4-methylphenol or a copper compound, in amounts of from 0.01 to 5% by weight of the copolymer and there may further be used as a reaction accelerator a peroxide such as ditertiary-butyl peroxide, benzoyl peroxide or lauroyl peroxide. In addition, in order to reduce the viscosity of the reaction system, thereby allowing the reaction to proceed smoothly, there may also be used benzene, toluene, xylene, tetralin and other solvents which are inert to the reaction system.

The reaction product or reacted copolymer obtained by the reaction between the liquid PD-BD copolymer and the $\alpha,\beta$-unsaturated dicarboxylic compound, has an acid value of usually 150 or less and it may be neutralized with an inorganic alkali salt or amine thereby rendering it soluble or dispersible in water. In the neutralization the alkaline materials may be used in amounts of 0.5 – 1.5 equivalent per COOH equivalent as determined from the acid value of the reacted copolymer.

The inorganic alkalis used herein include ammonia water, sodium hydroxide and potassium hydroxide; the alkali salts used herein include ammonium carbonate, sodium carbonate and potassium carbonate; and the amines used herein include ethanolamine, diethanolamine, triethanolamine, dimethylaminoethanol, trimethylamine and N-methylmorpholine.

The reaction product so made soluble or dispersible in water is dissolved or dispersed in water to form a usually 5 – 60% aqueous solution or dispersion thereof which can be used as an aqueous coating composition. If a coating composition is desired particularly for use as an electrophoretic coating material, the composition should contain the reaction product or modified copolymer in amounts of 5 – 25% by weight and have a pH of from 6.5 to 9.0. These coating compositions may further be combined or admixed with commonly used fillers, pigments and other additives if desired.

There may be obtained a uniform electrophoretically formed coating by applying current through an article to be coated as the anode in a bath of the thus-produced coating composition of this invention. In this case, the coating composition of this invention exhibits electrophoretically excellent properties expressed in terms of washability, drainage and throwing power. In addition, the coating after being dried is remarkably improved in Erichsen value, Du Pont impact strength and solvent resistance attributes in which liquid polybutadienes have been previously defective. In addition, this dried coating has excellent hardness and higher dielectric breakdown voltage than conventional ones. Satisfactory results may be obtained with even thinner coatings produced from the new coating composition of this invention than those produced from the conventional composition since the former are excellent in electrical insulation, and the new coating composition is suitable as an electrophoretically thin film-forming coating material. It has heretofore been known that excellent electrophoretic coating materials can be obtained by using a mixture of a liquid cis-1,4-polybutadiene with a liquid polypentadiene prepared by cationic polymerization; however, the aforementioned effects and advantages obtained by the practice of this invention would be surprising and unexpected from the known information or prior art, and this will be further apparent from the following examples.

This invention will be better understood by the following examples in which all the parts are by weight unless otherwise indicated.

REFERENCE EXAMPLE 1

To an 800-ml pressure-proof glass reactor purged with nitrogen, were added a total of 200 g of the monomers mixed with each other in the ratio indicated in Table 1 and 80 g of n-pentane to form a mixture which was thoroughly mixed and then combined with a reaction product obtained by previously reacting 2.0 g of boron trifluoride.diethyl etherate and 0.254 g of water. The whole mass was subjected to polymerization at 30°C for 2 hours. The polymerizing reaction was terminated by the addition of 20 ml of methanol to the reaction system and the reaction product was then dried at 60°C under a reduced pressure of 1 mm Hg for two hours to obtain a brown-colored liquid polymer. The yield of the polymer so obtained was calculated with respect to the total of the unsaturated monomers used; the content of the gel produced in the polymer was determined by dissolving the polymer in a volume of toluene which was ten times as much as that of said polymer and then passing the resulting solution through an 80-mesh wire net to leave thereon the gel for measuring its weight; the number average molecular weight of the polymer was determined by Vapor Pressure Osmometry (VPO); and the iodine value was measured in accordance with the Wijs method prescribed in JIS (Japanese Industrial Standard) K-5400. The results are shown in Table 1.

Table 1

|  | Control | Samples according to this invention | | | Control |
| --- | --- | --- | --- | --- | --- |
|  | Polymer A | Polymer B | Polymer C | Polymer D | Polymer E |
| Monomers used: | | | | | |
| 1,3-pentadiene (Parts) | 100 | 86 | 70 | 55 | 25 |
| 1,3-butadiene (Parts) | — | 14 | 30 | 45 | 75 |

Table 1 — Continued

|  | Control | Samples according to this invention | | | Control |
| --- | --- | --- | --- | --- | --- |
|  | Polymer A | Polymer B | Polymer C | Polymer D | Polymer E |
| Starting polymers: | | | | | |
| Yield (%) | 98 | 90 | 88 | 78 | 67 |
| Gel content (%) | 0.3 | 0.2 | 1.6 | 2.1 | 18.4 |
| Number average m.w. | 1100 | 1100 | 1100 | 1100 | 1000 |
| Iodine value | 282 | 271 | 289 | 306 | — |

From the Table it is seen that with the increase of the amount of 1,3-butadiene used, the amount of gel formed remarkably increases.

REFERENCE EXAMPLE 2

A 130-ml separable flask provided with a pipe through which nitrogen is blown thereinto and with a reflux condenser, was charged with each of the polymers A–D obtained in Reference Example 1 and then with xylene to form a homogeneous solution therein. The solution was combined or admixed with copper naphthenate as an anti-gelling agent, heated to 130°C in a nitrogen atmosphere and then combined or admixed with maleic anhydride. The whole mass was heated to 180° – 190°C for two hours, after which the reaction mixture so obtained was subjected to a spot test using dimethylaniline to confirm whether or not unreacted maleic anhydride was present therein. The maleic-modified polymer from the reaction mixture was tested for its acid value in accordance with JIS K-5400 and separately tested using each of Butylcellosolve, toluene and carbon tetrachloride as the solvent, for its state of dissolution thereby confirming whether or not gel formation took place. In addition, the same procedure and test as mentioned above were followed except that for the starting polymer used there was substituted following each of the liquid cis-polybutadiene, a mixture of liquid cis-polybutadiene with liquid polypentadiene (Polymer A), and the liquid 1,2-polybutadiene as indicated in Table 2. The results are shown in Table 2.

polymer according to this invention in that they are both normally in a liquid form,) has a lower acid value than that according to this invention. The 1,2-polybutadiene exhibits "Positive" in the spot test and is inferior in reactivity with maleic anhydride.

EXAMPLE 1

Eighty-five parts of each of the modified polymers F-K obtained in Reference example 2 were combined or admixed with 15 parts of Butylcellosolve and with triethylamine in the amount of approximately 0.8 equivalents per COOH equivalent of the polymer. The resulting mixture was thoroughly blended and then admixed with deionized water in such amount as to obtain a coating composition containing about 10 – 11% by weight of the modified polymer. Each of the coating compositions 1 – 6 so obtained was passed through an 80-mesh wire net, if necessary, to remove water-insoluble gel, tested for its pH and then subjected to a electrophoretic coating test conducted under the following conditions:

| Voltage | Varied |
| --- | --- |
| Current application time | 2 minutes |
| Interpolar distance | 7 cm |
| Anode plate | (0.5 mm × 50 mm × 100 mm, made of phosphated iron plate) |
| Agitation of bath | Carried out |
| Temperature of bath | 25°C |

The optimum voltage varied depending upon the coating composition or bath used. Table 3 shows the Table 2

|  |  | Control (Reacted=3 polymer) | Reacted polymer according to this invention | | | | Control (Reacted polymer) | |
| --- | --- | --- | --- | --- | --- | --- | --- | --- |
|  |  | F | G | H | I | J | K | L |
| Starting polymer A | (Parts) | 100 | — | — | — | — | 30 | — |
| Starting polymer B | (Parts) | — | 100 | — | — | — | — | — |
| Starting polymer C | (Parts) | — | — | 100 | — | — | — | — |
| Starting polymer D | (Parts) | — | — | — | 100 | — | — | — |
| Liquid cis-polybutadiene*1 | (Parts) | — | — | — | — | 100 | 70 | — |
| Liquid 1,2-polybutadiene*2 | (Parts) | — | — | — | — | — | — | 100 |
| Maleic anhydride | (Parts) | 18 | 18 | 18 | 18 | 18 | 18 | 18 |
| Xylene | (Parts) | 10 | 10 | 10 | 10 | 10 | 10 | 10 |
| Copper naphthenate | (Parts) | 0.03 | 0.03 | 0.03 | 0.03 | 0.03 | 0.03 | 0.03 |
| Spot test |  | Negative | Negative | Negative | Negative | Negative | Negative | Positive |
| Acid value (KOH mg/g) |  | 85 | 86 | 84 | 88 | 77 | 85 | — |
| Gel formed: Butylcellosolve |  | None | None | None | None | None | None | Not a little |
| Toluene |  | None | None | None | None | None | None | Not a little |
| Carbon tetrachloride |  | None | None | None | None | None | None | Not a little |

*1 Polyoil Huls 110 (Number average molecular weight, 1400) produced by Huls Co.
*2 Nisso-PB B-2000 (Number average molecular weight, 2000) produced by Nippon Soda Co.
*3 Reacted polymer: Maleic anhydride-reacted copolymer (not neutralized)

It is seen from this Table that the reaction between liquid polypentadiene and maleic anhydride proceeds very promptly without gel formation in the product obtained. The modified polymer obtained from the cis-polybutadiene which is identical (with the starting data obtained at 100 volts which is the optimum voltage for the liquid polypentadiene.

At the end of the application of current, the test pieces so electrophoretically coated were withdrawn from the bath and subjected to washing with a strong water stream directed against the coating formed on the test pieces to thereby wash down the coating composition carried from the bath. The coated test pieces so washed were then air dried in a chamber at 25°C under a relative humidity of 75%, during which they were tested for their drainage. After the drying they were transferred into a hot air-circulating oven at 180°C to cure the coatings. In this manner the coating compositions were tested to find electrophoretic properties required during the electrophoretic coating operation, and the final electrophoretically coated products were further tested for various properties of the coatings formed thereon. The results are indicated in Table 3.

In this Table the water and solvent resistances are those which were estimated based on whether or not there was crimping, checking, blistering and flaking on the coatings formed on the test pieces when exposed to water and the solvent, respectively. The coating obtained from the coating composition 1 caused crimping and blistering, while those from the compositions 2 – 6 were all satisfactory. The corrosion resistance was estimated by the extent to which rusting of the metal substrate or blistering were noticed on the coatings with the result that the coating obtained from the composition 1 was found to allow spotted rust to be created from the metal substrate, while those obtained from the compositions 2 – 6 were all satisfactory.

lent water washable property, drainage and throwing power of a liquid polypentadiene. Said coatings further exhibit their remarkably high dielectric breakage voltage as compared with those indicated as the controls, and this is such that those skilled in the art could not anticipate from the known information. Since such coatings according to this invention exhibit high dielectric breakage voltage they may be formed in extremely small thicknesses for certain purposes as compared with conventional ones. This is one of the features of this invention and shows that the coating compositions of this invention are very suitable for use as a vehicle for electrophoretically thin film-forming paints.

As is seen from the results obtained with the coating compositions 5 and 6 used as the controls, the drawbacks of a liquid cis-polybutadiene can be reduced by mixing a liquid polypentadiene therewith and, however, the compositions 5 and 6 when coated will not form coatings characterized by such high dielectric breakage voltage and small thickness as those of this invention.

EXAMPLE 2

Electrophoretic or cataphoretic coating was carried out using as the bath each of the coating compositions 1, 3 and 5 prepared in Example 1 respectively at voltages of 60, 120, 160 and 240 volts to find the electrophoretic coating characteristics of the composition and Table 3

| Coating composition | Control | Composition according to this invention | | | Control | |
|---|---|---|---|---|---|---|
| | 1 | 2 | 3 | 4 | 5 | 6 |
| Polymer | F | G | H | I | J | K |
| Concentration of polymer (wt.%) | 10.0 | 11.1 | 10.2 | 11.1 | 10.0 | 10.0 |
| pH | 7.8 | 7.5 | 7.4 | 7.2 | 7.8 | 7.4 |
| Electrophoretic characteristics of the coating composition: | | | | | | |
| Washability | O | O | O | O | O | O |
| Drainage | O | O | O | O | O | O |
| Throwing power (%) | 100 | 100 | 100 | 100 | 80 | 100 |
| Dielectric breakage voltage (V) | <180 | >240 | >240 | >240 | <140 | <140 |
| Properties of electrophoretically formed film: | | | | | | |
| Film thickness ($\mu$) | 7 | 5 | 5 | 7 | 16 | 16 |
| Mirror reflection 60° (%) | 86 | 87 | 90 | 87 | 83 | 85 |
| Cross-cut value | 80 | 100 | 100 | 100 | 100 | 100 |
| Pencil hardness | 3H | 9H | 9H | 8H | 2H | 2H |
| Erichsen (mm) | 1 | 6 | 6 | 6 | 7 | 9 |
| Du Pont impact strength (½"×g×cm) | 300×10 | 500×30 | 500×30 | 500×30 | 500×40 | 500×50 |
| Water resistance[1] | × | O | O | O | O | O |
| Corrosion resistance (Saline spray)[2] | Spotted rust | O | O | O | O | O |
| Solvent resistance[3] | × | O | O | O | O | O |

Note:
O Satisfactory
× Unsatisfactory
[1] JIS K-5400
Immersed in water at 20°C for three days.
[2] JIS Z-2371
Sprayed with a 5% aqueous solution of sodium chloride at 35°C for 50 hours.
[3] JIS K-5400
Immersed in a mixture of 9 parts by volume of petroleum benzine and 1 part by volume of toluene, at 20°C for 48 hours.

From these results it is seen that the coating compositions of this invention when coated will form coatings having remarkably improved Erichsen value, Du Pont impact strength, water resistance and solvent resistance as well as excellent pencil hardness as compared with a liquid polypentadiene, without degrading the excelthe properties of the coating so formed. The other conditions of coating operation in each case were the same as those used in Example 1. The results are indicated in Table 4, from which it is seen that the coating compositions of this invention when used in the formation of electrophoretic coatings thereof, will permit the use of a wide range of voltages and exhibit excellent electrophoretic coating characteristics with the result that coatings having excellent properties are obtained.

prises units derived from at least one other olefin in amounts of not more than 20% by weight of the total of the 1,3-pentadiene and 1,3-butadiene units.

Table 4

| Coating composition | Control | | | | Sample of this invention | | | | Control | | | |
|---|---|---|---|---|---|---|---|---|---|---|---|---|
| | 1 | 1 | 1 | 1 | 3 | 3 | 3 | 3 | 5 | 5 | 5 | 5 |
| Polymer | F | F | F | F | H | H | H | H | J | J | J | J |
| Concentration of polymer (wt.%) | 10.0 | 10.0 | 10.0 | 10.0 | 10.2 | 10.2 | 10.2 | 10.2 | 10.0 | 10.0 | 10.0 | 10.0 |
| pH | 7.8 | 7.8 | 7.8 | 7.8 | 7.4 | 7.4 | 7.4 | 7.4 | 7.8 | 7.8 | 7.8 | 7.8 |
| Voltage (volt) | 60 | 120 | 160 | 240 | 60 | 120 | 160 | 240 | 60 | 120 | 160 | 240 |
| Electrophoretic coating characteristics: | | | | | | | | | | | | |
| Washability | ○ | ○ | ○ | — | ○ | ○ | ○ | ○ | ○ | ○ | — | — |
| Drainage | ○ | ○ | ○ | — | ○ | ○ | ○ | ○ | ○ | ○ | — | — |
| Throwing property (%) | 100 | 100 | 100 | — | 100 | 100 | 100 | 100 | 80 | 80 | — | — |
| Properties of electrophoretically formed film: | | | | | | | | | | | | |
| Film thickness (μ) | 3 | 9 | 12 | — | 3 | 6 | 9 | 9 | 8 | 17 | — | — |
| Cross-cut value | 80 | 80 | 80 | — | 100 | 100 | 100 | 100 | 100 | 100 | — | — |
| Erichsen value | 1 | 1 | 1 | — | 6 | 6 | 6 | 5 | 10 | 5 | — | — |
| Solvent resistance | × | × | × | — | ○ | ○ | ○ | ○ | ○ | ○ | — | — |

Note:
○ Satisfactory
× Unsatisfactory

What is claimed is:

1. An aqueous coating composition comprising a water-soluble or water-dispersible copolymer prepared by addition reacting with at least one $\alpha,\beta$-unsaturated dicarboxylic compound a liquid copolymer comprising 90–50% by weight of 1,3-pentadiene units and 10–50% by weight of 1,3-butadiene units and having an average molecular weight of 500–5,000, the liquid copolymer having been prepared by the copolymerization of 1,3-pentadiene and 1,3-butadiene in the presence of a Friedel-Crafts type catalyst, and neutralization of the thus-obtained modified copolymer to make it soluble or dispersible in water.

2. An aqueous coating composition as claimed in claim 1, wherein the $\alpha,\beta$-unsaturated dicarboxylic compound is represented by the general formula

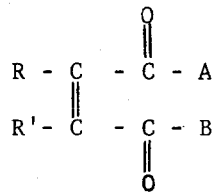

wherein R and R' are selected from the group consisting of a hydrogen atom, a halogen atom, and an alkyl group and wherein A and B are selected from the group consisting of a hydroxyl group, an alkoxy group, and an —O— bond formed by A and B together, provided that A and B are not simultaneously an alkoxy group.

3. An aqueous coating composition as claimed in claim 1, wherein the $\alpha,\beta$-unsaturated dicarboxylic compound is a member selected from the group consisting of maleic acid, maleic anhydride, chloromaleic anhydride, citraconic anhydride, 1,2-diethylmaleic anhydride, monomethyl maleate and monoethyl maleate.

4. An aqueous coating composition as claimed in claim 1, wherein the liquid copolymer further com- 5. An aqueous coating composition as claimed in claim 4, wherein the other olefin is a member selected from the group consisting of butene-1, isobutylene, isoprene, 2-methylbutene-2 and cyclopentene.

6. A process for the preparation of an aqueous coating composition comprising the steps of copolymerizing, in the presence of a Friedel-Crafts type catalyst, a monomer reactant selected from the group consisting of 1,3-pentadiene and 1,3-butadiene; and 1,3-pentadiene, 1,3-butadiene and at least one other olefin copolymerizable with said dienes, under such conditions that the resulting copolymer comprises 90–50 parts by weight of 1,3-pentadiene polymerization units, 10–50 parts by weight of 1,3-butadiene and not more than about 20 parts by weight of the other olefin polymerization units and has an average molecular weight of 500–5,000; addition reacting the thus-obtained copolymer with at least one $\alpha,\beta$-unsaturated dicarboxylic compound; and then neutralizing the thus-modified copolymer to make it soluble or dispersible in water.

7. A process as claimed in claim 6, wherein the other olefin is a member selected from the group consisting of maleic acid, maleic anhydride, chloromaleic anhydride, citraconic anhydride, 1,2-diethylmaleic anhydride, monomethyl maleate and monoethyl maleate.

8. A process as claimed in claim 6, wherein the $\alpha,\beta$-unsaturated dicarboxylic compound is represented by the general formula

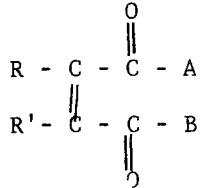

wherein R and R' are selected from the group consisting of a hydrogen atom, a halogen atom, and an alkyl group and wherein A and B are selected from the group consisting of a hydroxyl group, an alkoxy group, and an —O— bond formed by A and B together, provided that A and B are not simultaneously an alkoxy group.

9. A process as claimed in claim 6, wherein the α,β-unsaturated dicarboxylic compound is a member selected from the group consisting of maleic acid, maleic anhydride, chloromaleic anhydride, citraconic anhydride, 1,2-diethylmaleic anhydride, monomethyl maleate and monoethyl maleate.

10. A process as claimed in claim 6, wherein the copolymer to be addition reacted and the α,β-unsaturated dicarboxylic compound are used in ratios by weight of from 100 : 3 to 100 : 100.

11. A process as claimed in claim 6, wherein the addition reaction is effected at 50° – 300°C for 1/12 – 10 hours.

12. A process as claimed in claim 8, wherein the copolymer to be addition reacted and the α,β-unsaturated dicarboxylic compound are used in ratios by weight of from 100 : 3 to 100 : 100.

13. A process as claimed in claim 10, wherein the addition reaction is effected at 50° – 300°C for 1/12 – 10 hours.

* * * * *